United States Patent [19]

Hutmaker

[11] 4,453,893

[45] Jun. 12, 1984

[54] DRAINAGE CONTROL FOR COMPRESSED AIR SYSTEM

[76] Inventor: Marlin L. Hutmaker, 420 N. 6th St., Wahpeton, N. Dak. 58075

[21] Appl. No.: 368,135

[22] Filed: Apr. 14, 1982

[51] Int. Cl.³ .................................................. F04B 49/00
[52] U.S. Cl. .................................... 417/279; 137/204; 417/316; 417/290
[58] Field of Search ................... 417/279, 316, 290; 137/204

[56] References Cited

U.S. PATENT DOCUMENTS 2,687,841  8/1954  Churchman ................... 137/204 X
3,014,687  12/1961  Keisling et al. ................ 137/204
3,582,233  6/1971  Bloom .......................... 417/279 X Primary Examiner—Edward K. Look
Attorney, Agent, or Firm—Schwartz, Jeffery, Schwaab, Mack, Blumenthal & Koch

[57] ABSTRACT

The invention comprises a valve contained in a drainage line from a compressor tank and a control for operating the valve. The control includes a timer which comprises an air storage tank, an air bleed valve for bleeding the storage tank and structure for operating the valve in response to air pressure received from the air storage tank. The timer operator is initiated in response to deactivation of the compressor motor.

10 Claims, 2 Drawing Figures

DRAINAGE CONTROL FOR COMPRESSED AIR SYSTEM

BACKGROUND OF THE INVENTION

1. Field of the Invention

This invention relates to automatically purged air compressor tanks and air lines to remove moisture, oil and other foreign material.

2. Discussion of Related Art

It is commonly known that various contaminants such as moisture, oil and rust particles build up in the tank and lines of a compressed air system. This foreign matter must be removed periodically in order to avoid damage to the system. One common method for purging a compressed air system is by use of a manual valve disposed in an outlet of the compressed air tank. However, manually operated valves do not dry the tank out and require constant attention. Accordingly, the need for a better system of draining compressed air systems has arisen.

A typical automatic drainage system uses a float connected to a valve which is opened by the float when water reaches a predetermined level. An example of this system can be seen in U.S. Pat. No. 190,895.

Another type of known drainage system is shown in U.S. Pat. No. 3,175,572. This system operates on a differential in pressure. The system works well for the removal of moisture but tends to become inoperative due to rust and other foreign material.

Other known systems use electrical timing mechanisms to energize a high pressure solenoid valve which drains the air tank. These systems suffer the disadvantage that the solenoid valve is operated only at predetermined times which are dependent upon the timer settings and not on the operating cycle of the system.

Some drainage devices are known which operate in dependance upon the operating cycle of the compressor system. U.S. Pat. No. 3,014,687 discloses an apparatus for draining a compressed air tank wherein the compressed air usually released to the atmosphere when the compressor stops is used to open a drain valve.

U.S. Pat. No. 3,341,111 discloses an automatically controlled drain valve wherein compressed air automatically opens the drainage valve at the beginning of each operating period of the compressor motor.

U.S. Pat. No. 3,646,727 shows a method and apparatus for automatically draining a liquid condensate from a tank wherein the drainage valve is opened and closed periodically by a pneumatic diaphragm.

U.S. Pat. No. 3,845,778 discloses an automatic drain valve device which is opened and closed by an abuttment that moves responsive to changes in pressure of a fluid in a storage reservoir.

SUMMARY OF THE INVENTION

One object of the present invention is to provide a drainage device for compressed air systems which utilizes the pressure of the system to purge moisture and other foreign matter at a high velocity for a short duration.

Another object of the present invention is to provide a drainage device for a compressed air system in which the compressed air system is purged periodically based upon the operation of the system compressor motor.

A further object of the present invention is to provide a drainage device for a compressed air system in which the duration of the system purge is controlled by a timer which is relatively simple in construction and can easily be adjusted to suit different conditions.

Another object of the present invention is to provide a drainage device for a compressed air system which is relatively inexpensive to manufacture yet is highly efficient and durable in use.

In accordance with the above and other objects, the present invention is an apparatus for controlling drainage of moisture and foreign matter from a compressor system. The apparatus comprises a valve contained in a drainage line from the compressor tank. A timer is connected to the valve and comprises an air storage tank, an air bleed valve for bleeding air from the air storage tank, and a valve control device for actuating the valve in response to air pressure received from the air storage tank. The timer is controlled by a device which operates in response to deactivation of the system compressor motor and alternately connects the air storage tank to the air bleed valve and valve control device, or to a compressed air source for filling the air storage tank.

In accordance with other features of the invention, the valve comprises an electrically operated solenoid valve while the valve control device comprises a pneumatically operated switch connected to the solenoid valve. The timer control device comprises a solenoid valve which is electrically connected to the compressor motor such that the air storage tank is connected to the air bleed valve and valve control device each time that the compressor motor is deactivated or shut off.

The bleed valve can be a manually adjustable valve which is set to a predetermined bleed rate. However, an automatic bleed rate control can also be used to vary the duration of the purge in dependence upon ambient humidity thereby ensuring that all of the moisture in the system will be purged during high humidity periods.

BRIEF DESCRIPTION OF THE DRAWINGS

The above and other objects of the present invention will become more readily understood as the invention is more fully explained in the detailed description to follow, reference being had to the accompanying drawings in which like reference numerals represent like parts throughout and in which.

DETAILED DESCRIPTION OF THE PREFERRED EMBODIMENT

Figure 1:
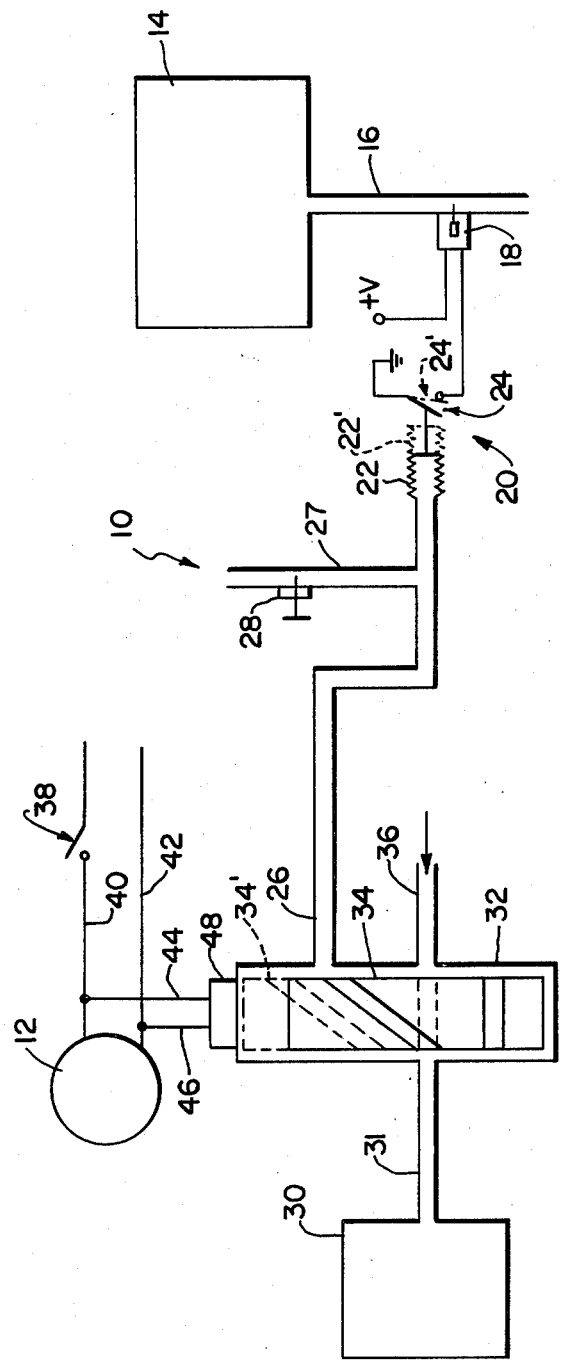
FIG. 1 is a schematic diagram showing the drainage device of the present invention connected with a compressor system.

FIG. 1 shows a drainage device 10 according to the present invention connected in a standard air compressor system. Only the pertinent portions of the system are shown for clarity. The air compressor system includes a compressor motor 12 which is energized through start/stop switch 38 and electrical lines 40 and 42. Compressor motor 12 operates a compressor (not shown) which fills compressor tank 14 in a known manner. Compressor tank 14 has a drain line 16 extending downwardly from the lowest point in the tank. Obviously, moisture and debris will accumulate in the lowest point of the tank and will flow through drain line 16 thus purging the tank whenever the drain line is open. A solenoid valve 18 is disposed in line 16. Valve 18 can be opened electronically to purge tank 14. The device takes advantage of the high pressure air in the air tank in order to purge the tank. When power is applied to solenoid valve 18, the valve opens instantly and air leaves the tank at a high velocity. Valve 18 is controlled by pneumatic switch 20. Switch 20 comprises a bellows 22 and switch contacts 24 which are directly connected to bellows 22 and opened and closed by the bellows. Bellows 22 is actuated by compressed air received through line 26 from air storage tank 30 through solenoid actuated valve 32. Valve 32 may be a standard spool valve which comprises a sliding spool 34. Spool 34 is moved by solenoid 48 which is energized through lines 44 and 46. A compressed air inlet line 36 is connected to one inlet of valve 32. Line 31 connects air storage tank 30 to valve 32 and line 26 connects bellows 22 to the valve. When spool 34 is in the position 34' depicted in phantom FIG. 1, compressed air inlet 36 is connected through line 31 to storage tank 30. Accordingly, storage tank 30 is filled to a predetermined pressure with compressed air. Line 36 can be connected to any source of compressed air, such as compressed air tank 14. When solenoid 48 is deenergized, spool 34 moves from the position shown in phantom at 34' to the rest position shown in solid lines thereby connecting storage tank 30 to bellows 22 through lines 31, 26 and valve 32. In this position, the bellows expand to the position shown in phantom at 22' thereby causing contacts 24 to close, as shown at 24'. Solenoid valve 18 is thus opened and the high pressure air within tank 14 quickly purges moisture and foreign matter from the tank.

Clearly, due to the high pressure in tank 14, only a minimum time is needed in order to purge the tank. The duration of operation of solenoid valve 18 is controlled by bleed line 27 and bleed valve 28 which is positioned in line 27. Bleed valve 28 is a manually operated valve which controls the rate at which compressed air from storage tank 30 leaves the tank. Clearly, when the pressure in storage tank 30 reaches a low level, bellows 22 returns to its initial position and opens switch contacts 24. Thus, valve 28 controls the duration of purging of tank 14 by controlling the rate of air bleed from tank 30. When valve 28 is opened fully, the purge time of tank 14 is a minimum. The further valve 28 is closed, the longer the purge time becomes.

In operation, when compressor motor 12 is on, as determined by start/stop switch 38 being closed, solenoid 48 is activated and thus spool 34 is in the position shown in phantom at 34' in FIG. 1. In this position, compressed air from line 36 fills storage tank 30. Thereafter, when motor 12 is shut off by opening switch 38, solenoid 48 is simultaneously deactivated and spool 34 is moved to its rest position shown in solid lines. Accordingly, compressed air from storage tank 30 extends bellows 22 which causes contacts 24 to close and valve 18 is opened. Simultaneously, the air from tank 30 is bled through bleed line 27 at a rate determined by valve 28. When tank 30 is fully bled, bellows 22 returns to its initial position and valve 18 is closed.

Thereafter, each time that motor 12 is started, tank 30 is refilled with compressed air through air line 36. Each time the motor 12 is stopped, tank 14 is momentarily purged for a duration determined by the setting of valve 28.

Figure 2:
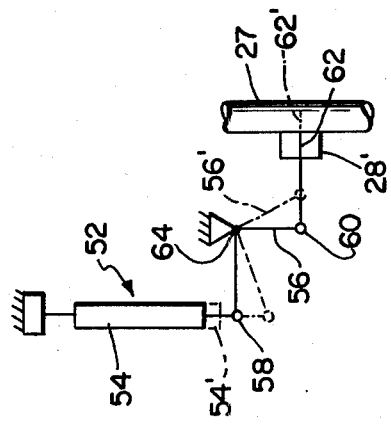
FIG. 2 is a bleed rate control device for use with the system of FIG. 1.

The amount of moisture accumulated in the compressed air system is determined to a great extent by atmospheric conditions. During periods of high humidity, greater amounts of moisture accumulate in the system and thus the purge time required must be increased in order to ensure that all of the moisture is removed. In order to automatically compensate for different humidity conditions, a humidity sensitive valve control 52, shown in FIG. 2, can be used with bleed valve 28' having slidable valve member 62. Clearly, as valve member 62 is slid across bleed line 27, the purge time of tank 14 is increased. Valve member 62 is pivotally connected at pivot joint 60 to one arm of bellcrank 56. The center of bellcrank 56 pivots about point 64 while the other arm of the bellcrank is pivotally connected to element 54 at pivot joint 58. Element 54 is any standard material which is known to expand with an increase in humidity. One example of a device which may be used as element 11 is a One Pipe Humidistat Model Number HP972B, sold by Honeywell, Inc. The upper end of element 54 is fixedly mounted and the lower end of the element containing pivot joint 58 is allowed to hang free. Accordingly, any expansion of element 54 causes the element lower end to move down thus pivoting bell crank 56 about point 64. Bell crank 56 in turn forces valve member 62 across bleed line 27. Element 62 can be adjusted such that, with element 54 in its least expanded position, as shown in FIG. 2, element 62 does not block lead line 27. When element 54 moves to its fully extended position, shown at 54', bell crank 56 moves to its fully tilted position, shown at 56', and valve element 62 moves to its fully extended position shown at 62'.

Operation of the humidity control device 52 should be apparent from the foregoing description. However, a further discussion of such operation will be now set forth to avoid any possible confusion. During operation in a low humidity environment, element 54 is in its least expanded condition and thus valve element 62 is fully retracted thus opening bleed line 27 to its fullest extent. Accordingly, when motor 12 is stopped and spool 34 is moved to the rest position, the air in storage tank 30 will bleed at its most rapid rate thus reducing the duration which valve 18 is opened thereby producing a minimum purge period for tank 14. As the humidity increases, element 54 expands thus moving valve element 62 across line 27. Consequently, when motor 12 is shut off as determined by on/off switch 38, the bleed time of tank 30 is increased thereby increasing the time during which valve 18 is opened. When the humidity in the atmosphere reaches a maximum, element 54 is fully extended thus moving valve element 62 to its extreme position across bleed line 27. This condition produces the longest bleed time and thus the longest period of time which valve 18 is opened and the longest surge time for tank 14. Clearly, valve element 62 should not completely close off bleed line 27 in its extreme extended position, otherwise tank 14 would be purged when compressor motor 12 shuts off. Clearly, the shape of element 62 can be such that an opening will always remain through which tank 30 can be bled.

The control 52 can be used in place of manual valve 28 for automatic control, valve 28 can be used without control 52 for purely manual control, or control 52 and valve 28 can be used in conjunction with each other in order to provide for a manually settable minimum bleed time under the control of valve 28. Clearly, other modifications, additions and changes to the present invention can be made by one of ordinary skill in the art without departing from the scope of the invention. The above description is meant to illustrate one mode of the invention and is not meant to limit the scope thereof, as defined in the appended claims.

What is claimed is:

1. In combination with a compressor system having a compressor motor and a compressed air tank, said tank containing a drain line, an apparatus for controlling drainage of said tank through said line, comprising:

valve means connected in said drain line for opening and closing said drain line;

timer means connected to said valve means for actuating said valve means, said timer means comprising: an air storage tank, an air bleed valve for bleeding said air storage tank, and valve control means for actuating said valve means in response to air pressure from said air storage tank; and timer control means responsive to operation of said compressor motor for alternately connecting said air storage tank to either said air bleed valve and said valve control means, or to a compressed air source driven by said motor for filling said storage tank and said compressed air tank, wherein said valve means comprises an electrically operated solenoid valve, and said valve control means comprises a pneumatically operated switch connected to said solenoid valve.

2. The invention as set forth in claim 1, wherein said timer control means comprises a solenoid valve electrically connected to said compressor motor for connecting said air storage tank to said air bleed valve and said valve control means each time said compressor motor is deactivated.

3. The invention as set forth in claim 1, wherein said air bleed valve is a manually adjustable valve.

4. The invention as set forth in claim 1, wherein said compressor system includes a start/stop switch for said compressor motor, and said timer control means operates in response to said start/stop switch.

5. In combination with a compressor system having a compressor motor and a compressed air tank, said tank containing a drain line, an apparatus for controlling drainage of said tank through said line, comprising:

valve means connected in said drain line for opening and closing said drain line;

timer means connected to said valve means for actuating said valve means, said timer means comprising: an air storage tank, an air bleed valve for bleeding said air storage tank wherein said air bleed valve is connected to means for controlling the bleed rate in response to ambient humidity, and valve control means for actuating said valve means in response to air pressure from said air storage tank; and timer control means responsive to operation of said compressor motor for alternately connecting said air storage tank to either said air bleed valve and said valve control means, or to a compressed air source driven by said motor for filling said storage tank and said compressed air tank.

6. The invention as set forth in claim 5, wherein said bleed rate control means comprises a member which expands with increased humidity, and linkage for reducing the opening of said bleed valve when said member expands.

7. In combination with a compressor motor and a compressor driven by said motor, an apparatus for controlling the drainage of fluids from a tank which is connected to said compressor, comprising:

a drain line connected to said tank;

valve means contained in said drain line;

timer means for opening said valve means, comprising a compressed air storage tank, means for periodically refilling said compressed air storage tank, means for bleeding air from said compressed air storage tank, and means responsive to said bleeding means for opening said valve means while air is being bled from said storage tank, said means responsive to said bleeding means comprising a bellows, a solenoid for operating said valve means, and a switch responsive to said bellows for operating said solenoid.

8. The invention as set forth in claim 7, and further including means responsive to operation of said compressor motor to activate said timer means.

9. The invention as set forth in claim 8, wherein said means responsive to operation of said compressor motor comprises an electromagnetic valve.

10. The invention as set forth in claim 8, wherein said compressor motor is connected to a start switch, and said means responsive to operation of said compressor motor is connected to said start switch for being activated in response to said compressor motor.

* * * * *